United States Patent
Seo

(10) Patent No.: US 9,654,681 B2
(45) Date of Patent: May 16, 2017

(54) ELECTRONIC APPARATUS AND METHOD OF CONTROLLING THE SAME

(71) Applicant: SAMSUNG ELECTRONICS CO., LTD., Suwon-si, Gyeonggi-do (KR)

(72) Inventor: Hyeong-chan Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 14/549,933

(22) Filed: Nov. 21, 2014

(65) Prior Publication Data

US 2015/0156400 A1 Jun. 4, 2015

(30) Foreign Application Priority Data

Dec. 3, 2013 (KR) .................. 10-2013-0149499

(51) Int. Cl.
*H04N 5/232* (2006.01)

(52) U.S. Cl.
CPC ............... *H04N 5/23212* (2013.01)

(58) Field of Classification Search
None
See application file for complete search history.

(56) References Cited

U.S. PATENT DOCUMENTS

| | | |
|---|---|---|
| 6,829,008 B1 | 12/2004 | Kondo et al. |
| 8,711,270 B2 | 4/2014 | Onuki et al. |
| 2009/0245778 A1 | 10/2009 | Shibuno et al. |
| 2009/0278966 A1 | 11/2009 | Kusaka |
| 2010/0080547 A1 | 4/2010 | Yanada |
| 2010/0177205 A1 | 7/2010 | Shimoda et al. |
| 2012/0044397 A1 | 2/2012 | Isobe |
| 2012/0057069 A1 | 3/2012 | Yamasaki |
| 2013/0016274 A1* | 1/2013 | Matsuo ................ H04N 5/3696 348/345 |

FOREIGN PATENT DOCUMENTS

| | | |
|---|---|---|
| JP | 2000-156823 A | 6/2000 |
| JP | 2009-244862 A | 10/2009 |

(Continued)

OTHER PUBLICATIONS

PCT Search Report and Written Opinion issued for PCT/KR2014/011344 (Feb. 6, 2015).

(Continued)

*Primary Examiner* — Roberto Velez
*Assistant Examiner* — Yih-Sien Kao
(74) *Attorney, Agent, or Firm* — Drinker Biddle & Reath LLP

(57) ABSTRACT

An electronic apparatus is described. The electronic apparatus includes: an image sensor including a plurality of image pixels and a plurality of focal point detection pixels; an auto-focus (AF) detection unit that detects an AF value based on a first focal point detection signal output from a first focal point detection pixel from the plurality of focal point detection pixels and a second focal point detection signal output from a virtual second focal point detection pixel corresponding to the first focal point detection pixel; and a control unit that generates image data based on an image signal output from the plurality of image pixels and the AF value detected by the AF detection unit.

21 Claims, 12 Drawing Sheets

(56) References Cited

FOREIGN PATENT DOCUMENTS

| | | |
|---|---|---|
| JP | 2013-190734 A | 9/2013 |
| KR | 10-2012-0017401 A | 2/2012 |
| WO | WO 2011/145016 A1 | 11/2011 |

OTHER PUBLICATIONS

Extended European Search Report issued for EP14196066.6 (Apr. 15, 2015).
Examination Report issued for related application EP 14196066.6, Apr. 5, 2016, 4 pages.

* cited by examiner

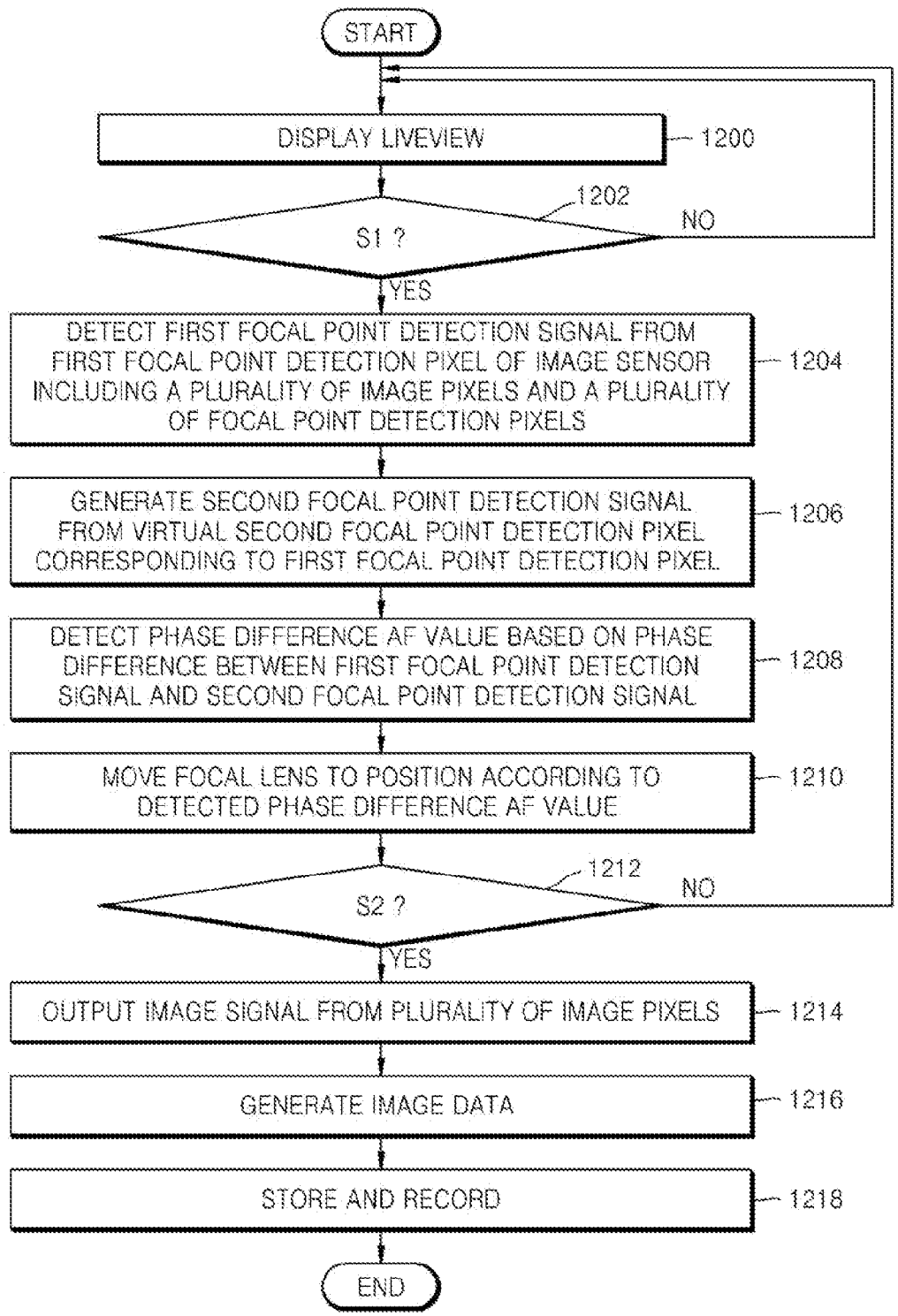

ELECTRONIC APPARATUS AND METHOD OF CONTROLLING THE SAME

CROSS-REFERENCE TO RELATED PATENT APPLICATIONS

This application claims the priority benefit of Korean Patent Application No. 10-2013-0149499, filed on Dec. 3, 2013, in the Korean Intellectual Property Office, the disclosure of which is incorporated by reference herein in its entirety.

BACKGROUND

1. Field

One or more embodiments relate to electronic apparatuses and methods of controlling the same.

2. Related Art

With the recent developments in digital photographing apparatuses, an image plane phase difference Auto-Focus (AF) method has been introduced. In this method, an image sensor, which includes a pixel that receives light that has passed through a portion of an exit pupil area of a photographing lens and a focal point detection pixel that receives light that has passed through the other portion of the exit pupil area, is used to detect a focal point. Thus, the pixel of the image sensor is read to display a liveview image simultaneously with detecting a focal point by reading the focal point detection pixel.

SUMMARY

One or more embodiments include an electronic apparatus including an image sensor including a pair of focal point detection pixels, wherein a second focal point detection pixel is formed by using image signals that are read out from image pixels adjacent to a first focal point detection pixel, so that the number of the defect focal point detection pixels in terms of image quality may be minimized, and a method of controlling the electronic apparatus.

One or more embodiments include an image sensor for a phase difference auto-focus (AF), is the image sensor being capable of preventing a decrease in image quality, achieving efficient HV (Horizontal transmit/Vertical receive) cross ranging, and obtaining a fast phase difference AF due to efficiently arranged focal point detection pixels.

Additional embodiments will be set forth in part in the description which follows and, in part, will be apparent from the description, or may be learned by practice of the presented embodiments.

According to one or more embodiments, an electronic apparatus includes: an image sensor including a plurality of image pixels and a plurality of focal point detection pixels; an auto-focus (AF) detection unit that detects an AF value based on a first focal point detection signal output from a first focal point detection pixel from the plurality of focal point detection pixels and a second focal point detection signal output from a virtual second focal point detection pixel corresponding to the first focal point detection pixel; and a control unit that generates image data based on an image signal output from the plurality of image pixels and the AF value detected by the AF detection unit.

The control unit may select the virtual second focal point detection pixel based on at least one image pixel adjacent to the first focal point detection pixel.

The control unit may generate the second focal point detection signal based on an image signal output from the selected virtual second focal point detection pixel.

The AF detection unit may detect a phase difference AF value from a phase difference between the first focal point detection signal output from the first focal point detection pixel and the second focal point detection signal generated from the virtual second focal point detection pixel.

The plurality of focal point detection pixels may include a plurality of horizontal focal point detection pixels and a plurality of vertical focal point detection pixels.

The plurality of image pixels and the plurality of focal point detection pixels may be repeatedly arranged in the image sensor, wherein a horizontal first focal point detection pixel and a vertical first focal point detection pixel are arranged in a first area of the image sensor, and a vertical second focal point detection pixel corresponding to the horizontal first focal point detection pixel and the vertical first focal point detection pixel is included in a second area adjacent to the first area in a horizontal direction.

The first focal point detection pixel may be the horizontal first focal point detection pixel, and the virtual second focal point detection pixel may correspond to the horizontal first focal point detection pixel.

The plurality of image pixels and the plurality of focal point detection pixels may be repeatedly arranged in the image sensor, wherein a vertical first focal point detection pixel and a horizontal first focal point detection pixel are arranged in a first area of the image sensor, and a horizontal second focal point detection pixel corresponding to the vertical first focal point detection pixel and the horizontal first focal point detection pixel is included in a second area adjacent to the first area in a vertical direction.

The first focal point detection pixel may be the vertical first focal point detection pixel, and the virtual second focal point detection pixel may correspond to the vertical first focal point detection pixel.

The control unit may generate the second focal point detection signal by dividing a sum of image signals of four G pixels that are vertically and horizontally adjacent to the first focal point detection pixel by 4.

The control unit may generate the second focal point detection signal by dividing a sum of image signals of two G pixels that are horizontally adjacent to the first focal point detection pixel by 2.

The control unit may generate the second focal point detection signal as an image signal of two G pixels horizontally adjacent to the first focal point detection pixel.

The first focal point detection pixel may be one of a left or right focal point detection pixel that is pupil-segmented.

The virtual second focal point detection pixel may be one of a right or left focal point detection pixel that is pupil-segmented and correspond to the one of the left or right focal point detection pixel that is pupil-segmented.

According to one or more embodiments, an image sensor for phase difference auto-focus (AF), includes: a plurality of image pixels and a plurality of focal point detection pixels that are repeatedly arranged; and a horizontal first focal point detection pixel and a vertical first focal point detection pixel arranged in a first area, wherein a horizontal AF value is detected based on a phase difference between a horizontal first focal point detection signal output from the horizontal first focal point detection pixel and a horizontal second focal point detection signal from a virtual second focal point detection pixel corresponding to the horizontal first focal point detection pixel, and a vertical horizontal AF value is detected based on a phase difference between a vertical first focal point detection signal output from the vertical first focal point detection pixel and a vertical second focal point detection signal from a virtual second focal point detection pixel corresponding to the vertical first focal point detection pixel.

The horizontal first focal point detection pixel and the vertical second focal point detection pixel may be arranged in a second area that is horizontally adjacent to the first area.

The vertical first focal point detection pixel and the horizontal second focal point detection pixel may be arranged in a second area that is vertically adjacent to the first area.

The first focal point detection pixel may be one of a left or right focal point detection pixel that is pupil-segmented.

The virtual second focal point detection pixel may be one of a right or left focal point detection pixel corresponding to the left or right focal point detection pixel that is pupil-segmented.

According to one or more embodiments, a method of controlling an electronic apparatus, includes: outputting a first focal point detection signal from a first focal point detection pixel from a plurality of focal point detection pixels of an image sensor including a plurality of image pixels and a plurality of focal point detection pixels; detecting an auto-focus (AF) value based on the output first focal point detection signal and a second focal point detection signal from a virtual second focal point detection pixel corresponding to the first focal point detection pixel; and generating image data based on an image signal output from the plurality of image pixels and the detected AF value.

The method may further include selecting the virtual second focal point detection pixel based on at least one image pixel adjacent to the first focal point detection pixels.

The method may further include generating the second focal point detection signal based on an image signal output from the selected at least one image pixel.

The detecting of the AF value may include detecting a phase difference AF value from a phase difference between the first focal point detection signal output from the first focal point detection pixel and the second focal point detection signal generated from the virtual second focal point detection pixel.

The plurality of image pixels and the plurality of focal point detection pixels may be repeatedly arranged in predetermined areas of the image sensor, wherein a horizontal first focal point detection pixel and a vertical first focal point detection pixel and a vertical second focal point detection pixel corresponding to the horizontal first focal point detection pixel and the vertical first focal point detection pixel are included in a same predetermined area of the predetermined areas.

The plurality of image pixels and the plurality of focal point detection pixels may be repeatedly arranged in predetermined areas of the image sensor, wherein a vertical first focal point detection pixel and a horizontal first focal point detection pixel and a horizontal second focal point detection pixel corresponding to the vertical first focal point detection pixel and the horizontal first focal point detection pixel are included in a same predetermined area of the predetermined areas.

BRIEF DESCRIPTION OF THE DRAWINGS

These and/or other embodiments will become apparent and more readily appreciated from the following description of various embodiments, taken in conjunction with the accompanying drawings in which:

FIG. 12 is a flowchart of a method of controlling an electronic apparatus according to an embodiment.

DETAILED DESCRIPTION

Figure 1:
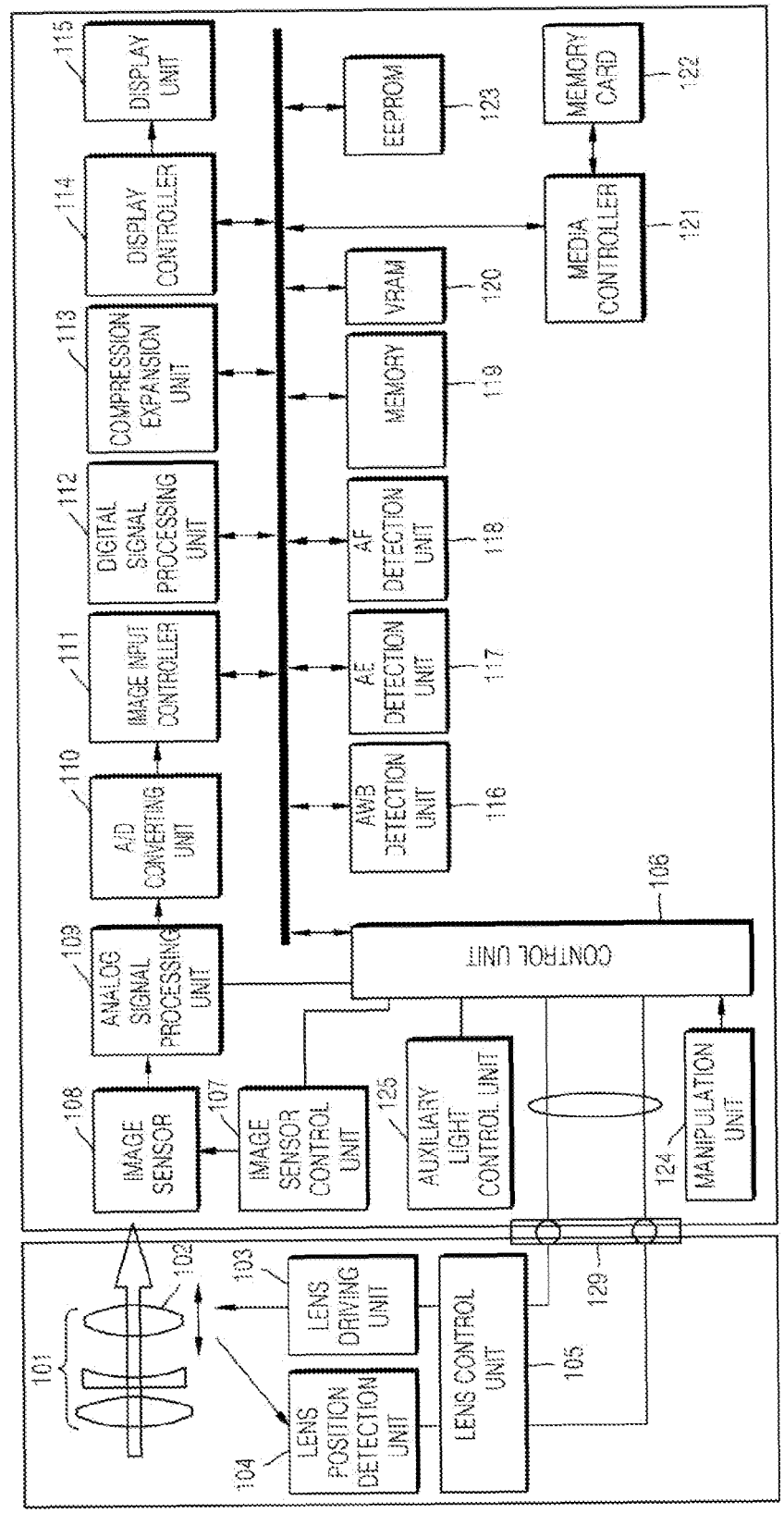
FIG. 1 is a block diagram illustrating an electronic apparatus capable of using an image plane phase difference Auto-Focus (AF) method, according to an embodiment.

Reference will now be made in detail to various embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain various features of the present description. Expressions such as "at least one of," when preceding a list of elements, modify the entire list of elements and do not modify the individual elements of the list.

As the invention allows for various changes and numerous embodiments, particular embodiments will be illustrated in the drawings and described in detail in the written description. However, this is not intended to limit the embodiments to particular modes of practice, and it is to be appreciated that all changes, equivalents, and substitutes that do not depart from the spirit and technical scope are encompassed in the embodiments. In the description, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the embodiments. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Various embodiments of the invention will be described below in more detail with reference to the accompanying drawings. Those components that are the same or are in correspondence are rendered the same reference numeral regardless of the figure number, and redundant explanations are omitted.

While a digital camera is described as an example of an electronic apparatus in the embodiments described below, the embodiments are not limited thereto and may be also applied to digital devices such as a digital camcorder, a personal digital assistant (PDA), a smartphone, or other electronic apparatus having an image capturing or photographing capability.

FIG. 1 is a block diagram illustrating an electronic apparatus 100 capable of using an image plane phase difference Auto-Focus (AF) method, according to an embodiment.

As illustrated in FIG. 1, the electronic apparatus 100 includes an image sensor 108 of a separable lens type. However, the image sensor 108 may also be of an integrated lens type. Phase difference AF and contrast AF may be performed by using the image sensor 108 according to various embodiments.

The electronic apparatus 100 includes a photographing lens 101 that includes a focus lens 102. The electronic apparatus 100 has a focal point detection function to thereby drive the focus lens 102. The photographing lens 101 includes a lens driving unit 103 that drives the focus lens 102, a lens position detection unit 104 that detects a position of the focus lens 102, and a lens control unit 105 that controls the focus lens 102. The lens control unit 105 communicates information about focal point detection with the control unit 160.

The image sensor 108 generates an image signal by capturing an image according to subject light that has passed through the photographing lens 101. The image sensor 108 may include, for example, a plurality of photoelectric converting units (not shown) arranged in a matrix shape and a transmission path (not shown) that reads out the image signal by moving charges from the photoelectric converting units. Focal point detection pixels may be arranged at a predetermined position of the image sensor 108 and in a predetermined % ratio so as to perform an image plane AF function. An operation of performing phase difference AF based on focal point detection pixels will be described below with reference to FIGS. 2, 3, 4, and 5.

An image sensor control unit 107 generates a timing signal so as to control the image sensor 108 to capture an image. Furthermore, the image sensor control unit 107 may sequentially read image signals when accumulation of charges at each scanning line is completed.

The image signals that are read out pass through an analog signal processing unit 109 and are converted into digital signals by an A/D converting unit 110, and then may be input to an image input controller 111 and processed.

A digital image signal input to the image input controller 111 has one or more of auto-white balance (AWB), auto-exposure (AE), or auto-focus (AF) operations performed on it in an AWB detection unit 116, an AE detection unit 117, and an AF detection unit 118, respectively. The AF detection unit 118 outputs a detection value with respect to a contrast value when contrast AF is performed, and outputs image information to a control unit 106 when phase difference AF is performed to perform a phase difference operation. The control unit 106 may calculate a phase difference by performing a correlation operation with respect to a plurality of pixel column signals. A position of a focal point or a direction of a focal point may be calculated based on a result of the phase difference operation.

A focal point detection pixel is output together with a liveview image or a preview image (hereinafter, "liveview" image) is output. That is, when outputting a liveview image, a predetermined pixel line is selectively read out from an image sensor to output an image signal, and in this case, an output of a focal point detection pixel may be included. Accordingly, focal point detection may be performed based on focal point detection information output from a focal point detection pixel.

The image signal is stored in a synchronous dynamic random access memory (SDRAM) 119, which is a temporary memory. The digital signal processing unit 112 performs a series of image signal processing operations such as gamma correction to thereby form a displayable liveview image or a photographing image. A compression/decompression (codec) unit 113 compresses the image signal in a compression format such as a joint photographic coding experts group (JPEG) compression format or a H.264 compression format or decompresses the image signal during replay thereof. An image file including the image signal that is compressed by using the compression expansion unit 113 is transmitted to a memory card 122 via a media controller 121 and is stored therein. Display image information is stored in a video RAM (VRAM) 120, and an image is displayed on a liquid crystal display (LCD) 115 via a video encoder 114. The control unit 106 controls operations of respective elements overall. An electrically erasable and programmable read only memory (EEPROM) 123 stores and retains information for correction of pixel defects of the image sensor 108 or adjustment information. A manipulation unit 124 receives various commands from a user to manipulate the electronic apparatus 100. The manipulation unit 124 may include various buttons such as a shutter-release button, a main button, a mode dial, or a menu button.

Figure 2:
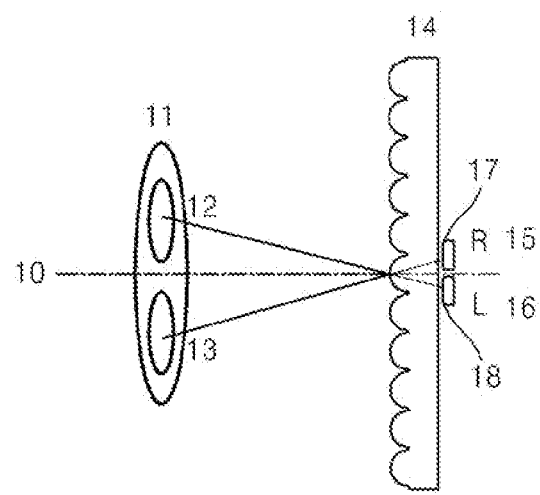
FIG. 2 is a diagram showing an example of a focal point detection pixel in the image sensor of FIG. 1, according to an embodiment.

FIG. 2 is a view to explain a focal point detection pixel in the image sensor 108 of FIG. 1.

Light reflecting off a subject, that has passed through a photographing lens 11 (e.g., the photographing lens 101) passes through a microlens array 14 and reaches light receiving pixels R 15 and L 16. Masks 17 and 18 that limit pupils 12 and 13 from the photographing lens 11 or a limited aperture is included at a portion of the light receiving pixels R 15 and L 16. Also, from pupils 12 and 13 of the photographing lens 11, light from the pupil 12 which is above an optical axis 10 of the photographing lens 11 reaches the light-receiving pixel L 16, and light from the pupil 13 below the optical axis 10 of the photographing lens 11 reaches the light receiving pixel R 15. Reception of light by the light receiving pixels R 15 and L 16 through the masks 17 and 18 or the aperture when the light is projected back on the pupils 12 and 13 through the microlens array 14 is referred to as pupil segmentation.

Regarding a pixel output due to pupil segmentation, continuous outputs from an array of the light receiving pixels R 15 and L 16 along the microlens array 14 have the same shape but different phases. This is due to different positions where images are formed based on deflected light from the pupils 12 and 13 of the photographing lens 11. Accordingly, if focus is not adjusted, outputs' phases are different, but if focus is adjusted, outputs' phases are the same. Also, if a subject is a front focused, an R column may be shifted to the left compared to a phase when focus is adjusted, and an L column may be shifted to the right compared to a phase when focus is adjusted. On the other hand, in the case of a subject that is rear focused, an R column is shifted to the right compared to a phase when focus is adjusted, and an L column is shifted to the left compared to a phase when focus is adjusted. According to the phase difference AF method, focus is detected based on the above-described information.

Figure 3:
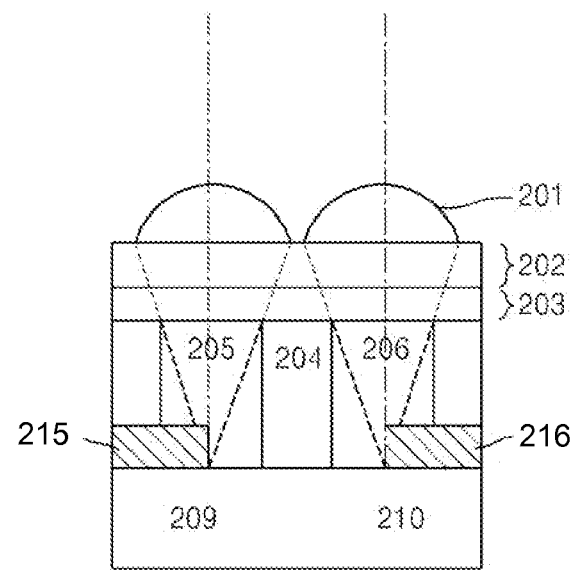
FIG. 3 is a structural diagram of a vertical pixel of a focal point detection pixel in an image sensor, according to an embodiment.

FIG. 3 is a structural diagram of a vertical pixel of a focal point detection pixel in an image sensor (e.g., the image sensor 108). While an R column pixel and an L column pixel are illustrated as being adjacent to each other in FIG. 3 for convenience of description, the embodiments are not limited thereto. Referring to FIG. 3, a microlens 201, a surface layer 202, a color filter layer 203, a wiring layer 204, photodiode layers 205, 206, 209, and 210, and a substrate layer (not shown) are included in the image sensor. It can be seen in FIG. 3 that the layers are simplified than actual ones. Light reflecting off a subject passes through the microlens 201 and arrives at a photodiode layer of each pixel. As light is received, charges are generated in the photodiode layers 209 and 210, thereby forming image information. Charges generated in the photodiode layers 209 and 210 may be output through the wiring layer 204. Light that reflects off the subject to be incident may be a total luminous flux that has transmitted through an exit pupil, and luminance information according to a position of the subject may be obtained according to a pixel position. The color filter layer 203 typically includes three colors of red (R), green (G), and blue (B) in each pixel, or may also include cyan (C), magenta (M), and yellow (Y) according to specifications. A shielding layer may be installed at an aperture in an image sensor so as to obtain signals of the R column and the L column. The shielding layer may include a R column shielding layer 215 and a L row shielding layer 216 in portions corresponding to the photodiode layers 205, 209 and 206, 210. In portions corresponding to the photodiode layer 205 and 209, the R column shielding layer 215 is provided, and for portions corresponding to the photodiode layer 206 and 210, the L column shielding layer 216 is provided. Positions of the R and L column shielding layers 215 and 216 are not limited to the positions illustrated in FIG. 3, and may be any position as long as the R and L column shielding layers 215 and 216 are between the microlens 201 and the photodiode layers 209 and 210.

Figure 4:
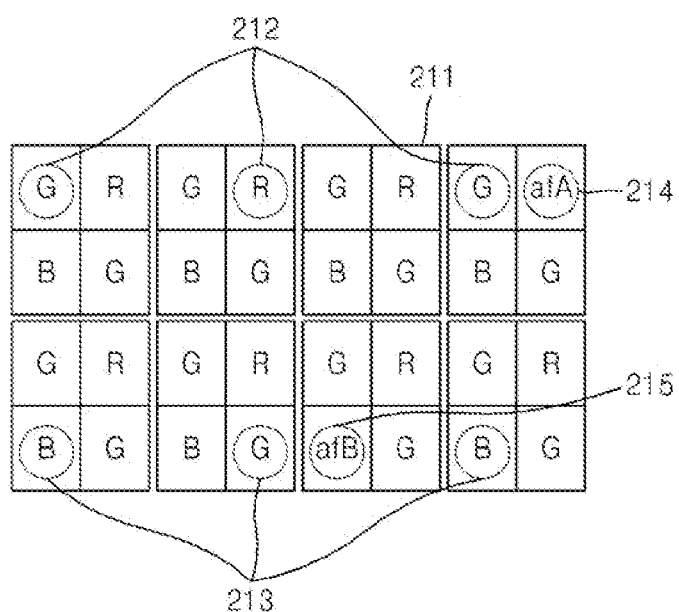
FIG. 4 is an expanded diagram of a pixel arrangement of focal point detection pixels in an image sensor, according to an embodiment.

FIG. 4 is an expanded diagram of a pixel arrangement of focal point detection pixels of the image sensor 108, illustrating a portion of the image sensor 108, according to an embodiment.

Referring to FIG. 4, in a pixel based on a Bayer arrangement 211 in which a RGB color filter is used, RGB pixels have respectively red, green, and blue filters. When outputting a liveview image, G, R pixels 212 and B, G pixels 213 may be read out. That is, only sampled pixels from the entire set of image pixels may be read out.

The focal point detection pixel illustrated in FIG. 3 is illustrated in FIG. 4 as a pixel afA 214 and a pixel afB 215 and may be arranged adjacent to each other. Accordingly, eight, twelve, or twenty-four pixels from focal point detection pixels of each column may be matched as a unit to an R column or L column of FIG. 2 and used in correlative computation that is described with reference to FIG. 2.

In a liveview mode, reading out of focal point detection pixels may be independent from reading out of an image capturing pixel column. Accordingly, after an image capturing pixel is read out, only a focal point detection pixel may be read out. However, when capturing an image, focal point detection pixels are sequentially read in the same manner as image capturing pixels.

Figure 5:
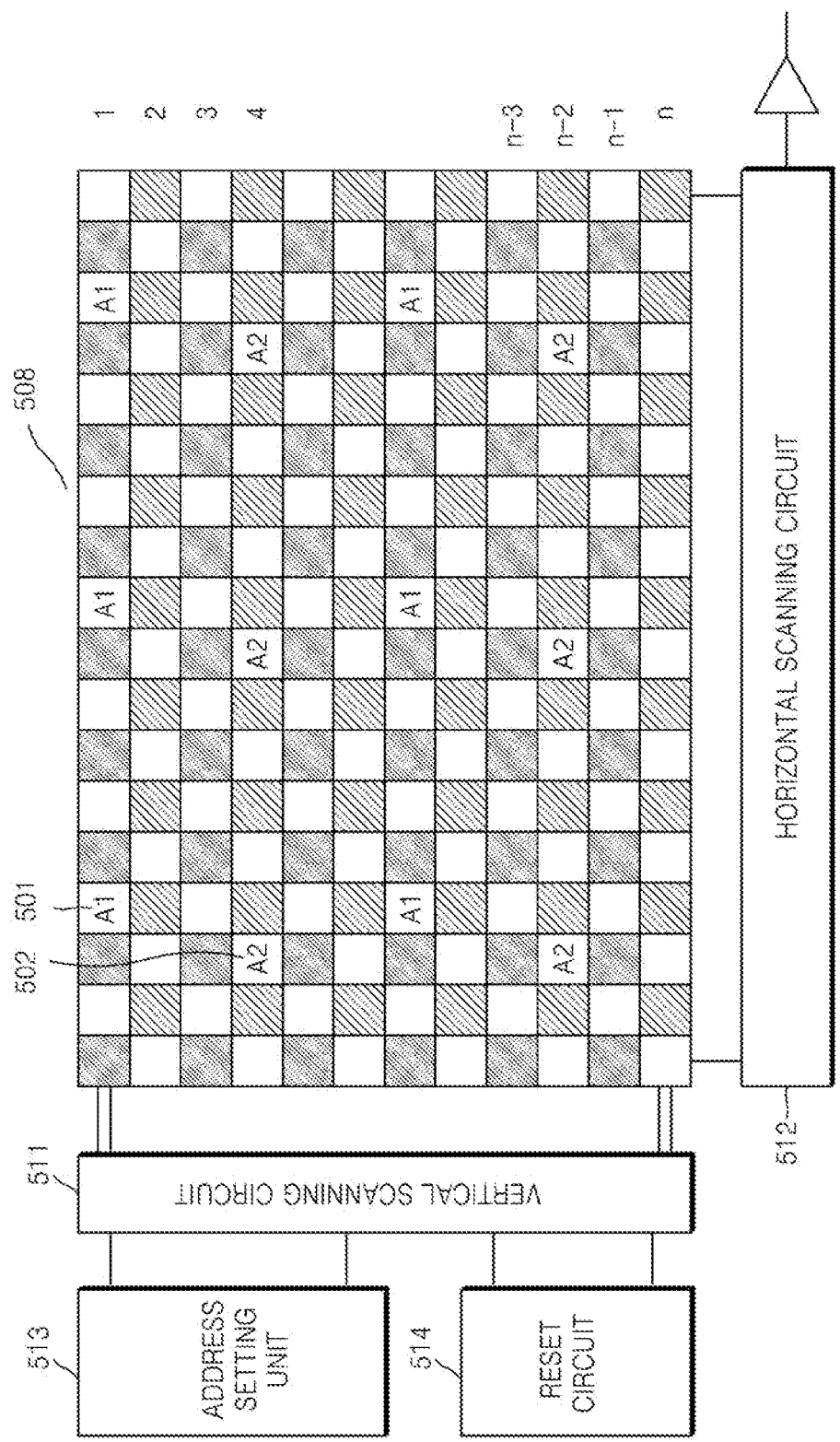
FIG. 5 is a view of a wide display range of pixels illustrated in FIG. 4 for illustrating a method of reading out an image sensor, according to an embodiment.

FIG. 5 is a view of a wide display range of pixels illustrated in FIG. 4, illustrating a method of reading out an image sensor 508.

Referring to FIG. 5, focal point detection pixels A1 501 and A2 502 of the image sensor 508 may each be arranged in units of pixels that detect a phase difference horizontally. Also, a vertical scanning circuit 511, a horizontal scanning circuit 512, an address setting circuit 513, and a reset circuit 514 may be connected to the image sensor 508 to read out charges accumulated in the image sensor 508.

First, the address setting unit 513 may set a pixel line which is to be read out through the vertical scanning circuit 511. Accordingly, the vertical scanning circuit 511 may sequentially read out pixel lines that are set by the address setting unit 513. The horizontal scanning circuit 512 may sequentially read out pixels of each column of lines that are read through the vertical scanning circuit 511. The reset circuit 514 may reset accumulated charges of a pixel whose reading out is completed so that charges to be read out in a next period may be accumulated. For example, when a captured image is output from the image sensor 508, the vertical scanning circuit 511 and the horizontal scanning circuit 512 may sequentially read out pixels of a top line up to pixels of an end line.

Figure 6:
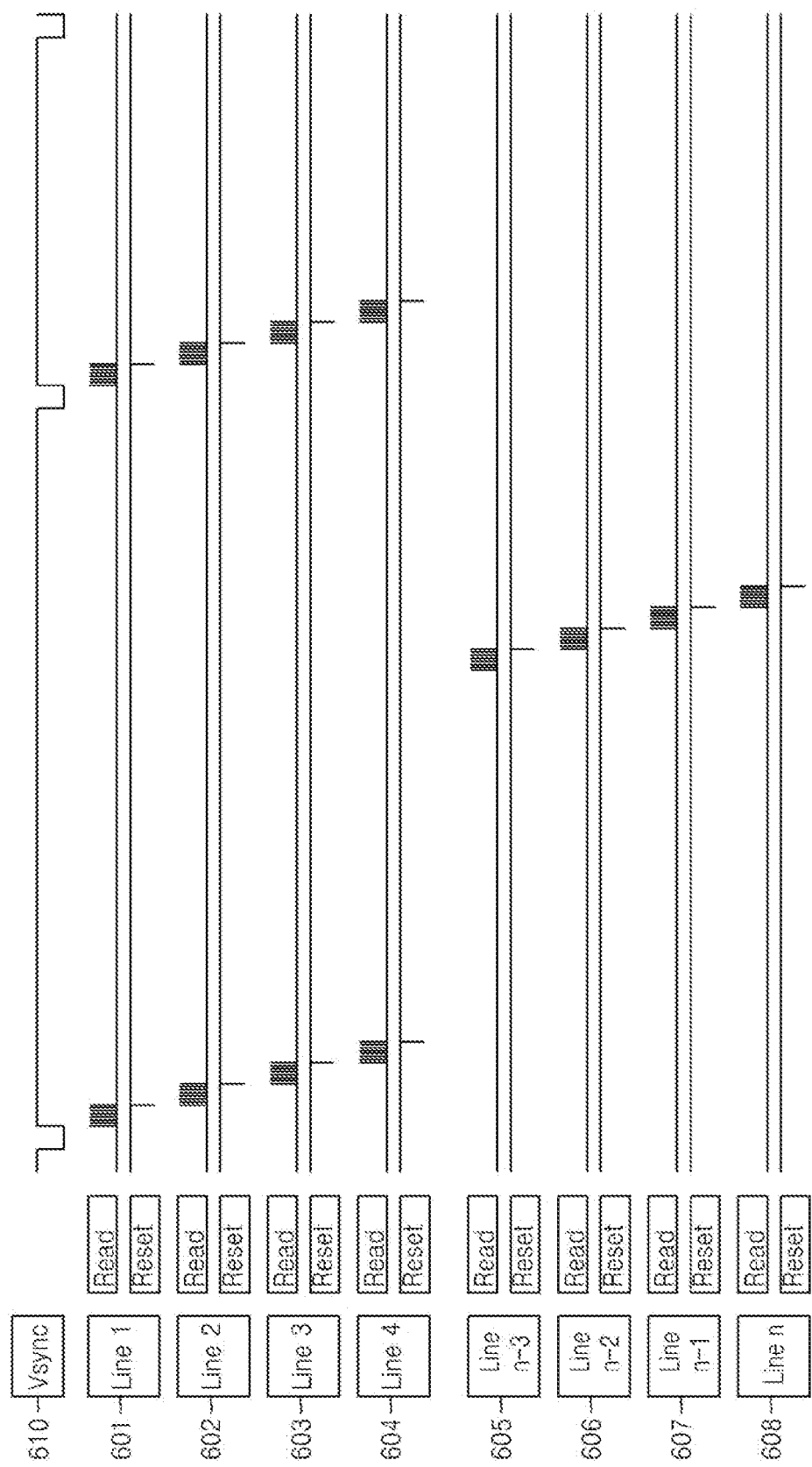
FIG. 6 is a timing diagram illustrating an example of reading out an image sensor according to an embodiment.

In detail, FIG. 6 is a timing diagram illustrating an example of reading out an image sensor 508 according to an embodiment.

Referring to FIG. 6, when outputting a captured image, all lines from a line 1 601 to n-th line 608 of the image sensor 508 may be sequentially read out. Reading out of the line 1 601 starts in response to a rising timing of a Vsync signal 610, and when reading out of the line 1 601 is completed, a reset signal is generated to start accumulating of new charges, and reading out of a next line, a line 2 602, is performed at the same time. When an operation as described above is completed up to a last line, the line n 608, reading out of one period is completed. Meanwhile, reading out of a single period may indicate a time period in which charges are accumulated in a pixel in order to form a single photographed image frame when photographing an image. Accordingly, when photographing an image in a liveview mode, a period may refer to a time period that takes to generate a frame.

Referring to FIG. 5 again, when outputting a liveview image, sampled pixels and focal point detection pixels 501 and 502 from all pixels of the image sensor 508 may be read out.

For example, the vertical scanning circuit 511 may selectively read out a predetermined line of the image sensor 508 to output an image signal for generating a liveview image according to setting of the address setting unit 513. In this case, the focal point detection pixels 501 and 502 may be included in the selected predetermined line. Accordingly, when reading out is performed, not only a liveview image but also focal point detection information may be output. Selective reading out is not limited to lines and also the horizontal scanning circuit 512 may selectively read out a vertical pixel column to output a liveview image and focal point detection information.

The above-described reading out operation is repeated by a frame period of a liveview image, and thus, focal point detection information accumulated in a focal point detection pixel may also be output for each frame. Thus, based on the output focal point detection information, a liveview image may be displayed simultaneously with detecting a focal point.

Figure 7:
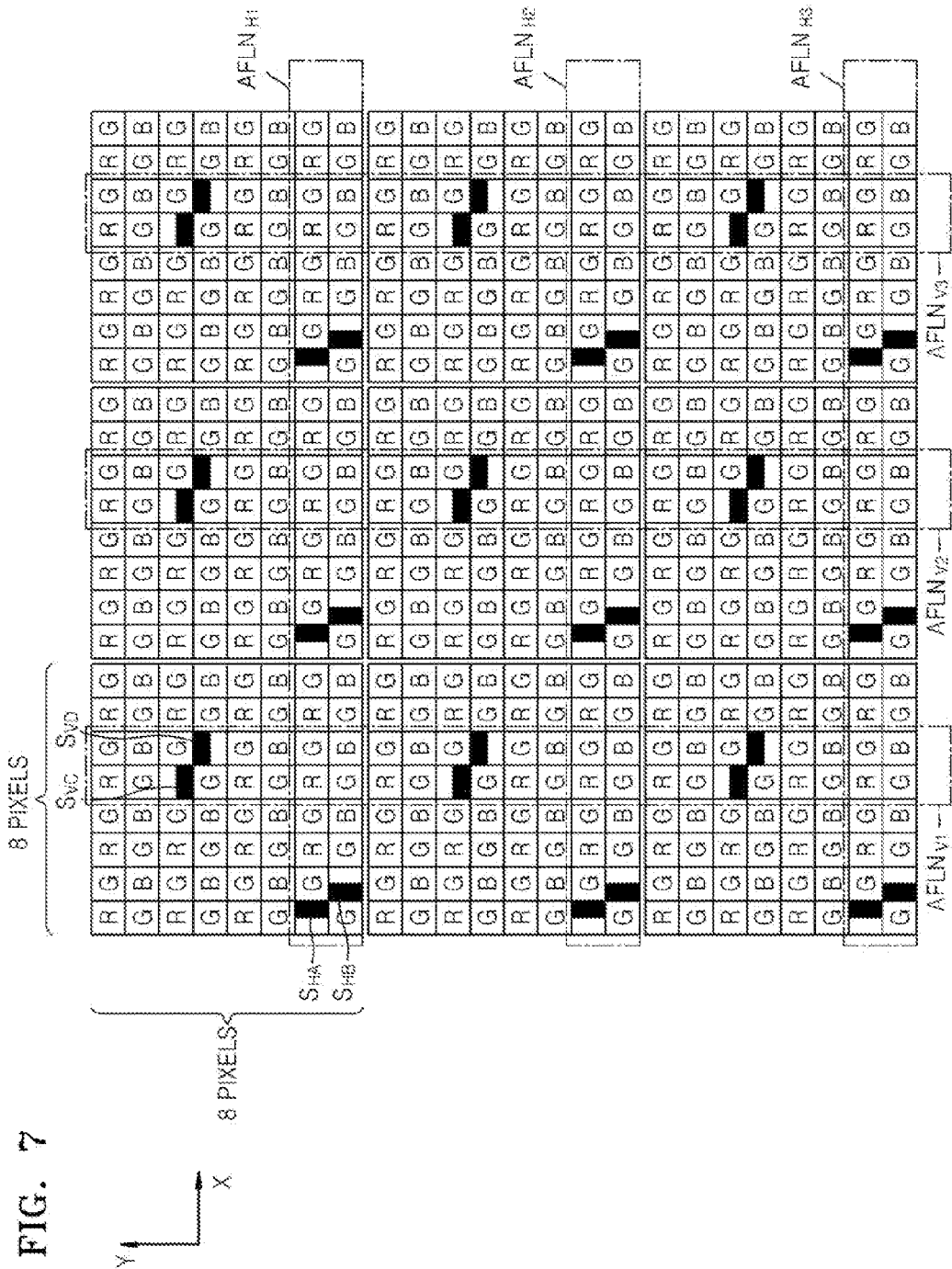
FIG. 7 illustrates an arrangement of focal point detection pixels in an image sensor according to an embodiment.
Figure 8:
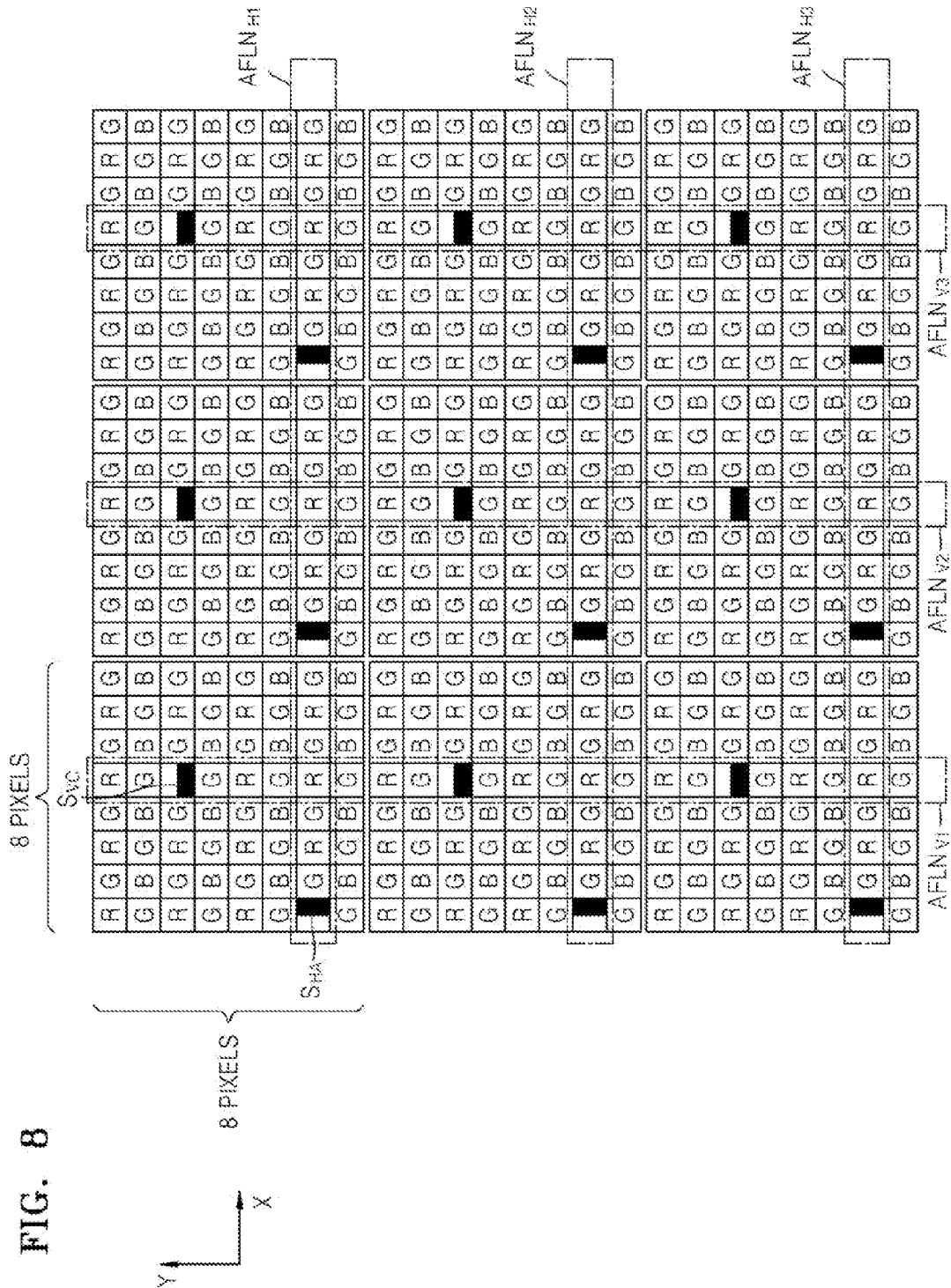
FIG. 8 illustrates an example of arranging focal point detection pixels in an image sensor according to an embodiment.

FIGS. 7 and 8 illustrate an arrangement of focal point detection pixels in the image sensor 108, according to an embodiment.

The image sensor 108 is formed by arranging a plurality of pixels two-dimensionally. The image sensor 108 has a Bayer arrangement in which, from sets of 2×2=4 pixels, two pixels having a green (G) spectral sensitivity are arranged diagonally, and a pixel having a red (R) spectral sensitivity and a pixel having a blue (B) spectral sensitivity are the remaining two pixels.

A block includes 8×8=64 pixels. A pair of focal point detection pixels $S_{HA}$ and $S_{HB}$ that horizontally segment a pupil and focal point detection pixels $S_{VC}$ and $S_{VD}$ that vertically segment the pupil are arranged in each block. An arrangement of focal point detection pixels in all blocks is the same. A block is repeatedly and regularly arranged in a pixel area of the image sensor 108. A method of using an output signal from a focal point detection pixel will be described. FIG. 8 also shows focal point detection lines $AFLN_{H1}$ through $AFLN_{H3}$ for detecting a horizontal phase difference. A disparity amount in a focal point of an image is calculated by calculating a phase difference between a first image signal consisting of output signals from focal point detection pixels $S_{HA}$ with respect to the focus detection lines $AFLN_{H1}$ through $AFLN_{H3}$ and a second image signal consisting of output signals from focal point detection pixels $S_{HB}$ (illustrated in FIG. 7) with respect to a predetermined single focus detection line $AFLN_{H1}$. Likewise, $AFLN_{V1}$ through $AFLN_{V3}$ are focal point detection lines used to detect a vertical phase difference. A disparity amount in a focal point of an image is calculated by calculating a phase difference between a third image signal consisting of output signals from focal point detection pixels $S_{VC}$ with respect to the focus detection lines $AFLN_{H1}$ through $AFLN_{H3}$ and a fourth image signal consisting of output signals from focal point detection pixels $S_{VD}$ (shown in FIG. 7) with respect to the predetermined focus detection line.

In the arrangement of the focal point detection pixels illustrated in FIG. 8 (the focal point detection pixels $S_{HA}$ and $S_{HB}$ illustrated in FIG. 7 in a horizontal direction and the focal point detection pixels $S_{VC}$ and $S_{VD}$ in a vertical direction), four focal point detection pixels are arranged in an area (8×8 pixel area). The AF accuracy increases as more pixels for detection phase difference focal points are used. However, since the focal point detection pixels are generally considered "defect pixels" in terms of resolution of an actual captured image, the AF accuracy has to be increased by using fewer focal point detection pixels.

Referring to FIG. 8, a block includes 8×8=64 pixels. Of a pair of focal point detection pixels $S_{HA}$ and $S_{HB}$, illustrated in FIG. 7, for horizontally segmenting a pupil, a focal point detection pixel $S_{HA}$ and a pixel $S_{VC}$ are arranged in the image sensor 108. Also, of a pair of focal point detection pixels $S_{VC}$ and $S_{VD}$, illustrated in FIG. 7, for vertically segmenting a pupil, a focal point detection pixel $S_{VC}$ is arranged in the image sensor 108. Each block shares the same arrangement of focal point detection pixels. The blocks are repeatedly and regularly arranged in pixel areas of the image sensor 108.

A focal point detection signal output from the focal point detection pixel $S_{HA}$ and a focal point detection signal from the focal point detection pixel $S_{HB}$, which is not actually arranged in the image sensor 108 (this pixel is referred to as a virtual focal point detection pixel), are generated. As the virtual focal point detection pixel, pixels adjacent to an actually arranged focal point detection pixel (e.g., a G pixel) are used. A method of generating a focal point detection signal from the virtual focal point detection pixel will be described with reference to FIG. 10. Selection of a virtual focal point detection pixel (that is, how to select an image signal value of which pixels or how to perform a calculation) and generation of the virtual focal point detection pixel may be performed by using the control unit 106 illustrated in FIG. 1.

Figure 10A:
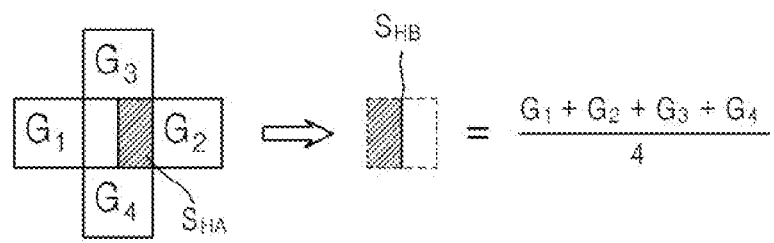
FIGS. 10A through 10C are exemplary diagrams illustrating generation of a focal point detection signal output from a virtual focal point detection pixel.
Figure 10B:
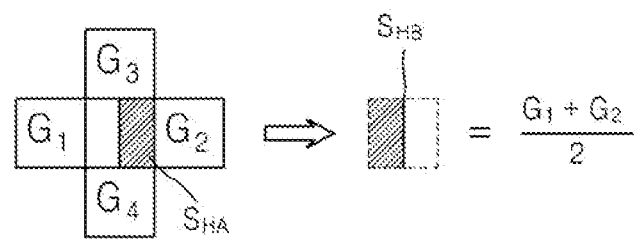
Figure 10C:
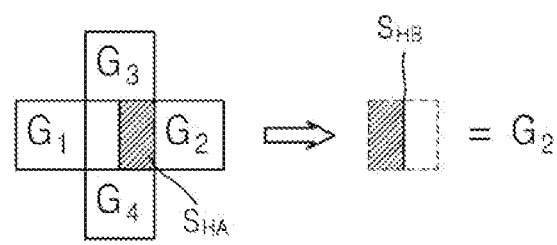

FIGS. 10A through 10C are exemplary diagrams illustrating generation of a focal point detection signal output from a virtual focal point detection pixel. Referring to FIG. 10A, the control unit 106 sums up four image signals of G pixels (G1 through G4) that are adjacent to an actually arranged focal point detection pixel $S_{HA}$ in vertical and horizontal directions and divides the summed image signals by 4 to generate a focal point detection signal from the focal point detection pixel $S_{HB}$.

Referring to FIG. 10B, the control unit 106 sums up two image signals of G pixels (G1 and G2) that are adjacent to an actually arranged focal point detection pixel $S_{HA}$ in a horizontal direction and divides the summed image signals by 2 to generate a focal point detection signal from a focal point detection pixel $S_{HB}$. Although two G pixels adjacent to a focal point detection pixel in a horizontal direction are used to describe FIG. 10B, the embodiments are not limited thereto, and two G pixels adjacent in a vertical direction may also be used.

Referring to FIG. 10C, the control unit 106 generates a focal point detection signal from a virtual focal point detection signal $S_{HB}$ based on an image signal of a G pixel G2 that is adjacent to an actually arranged focal point detection pixel $S_{HA}$ on the right. Although the G pixel adjacent to a focal point detection pixel on the right is used to describe FIG. 10C, the embodiments are not limited thereto and a pixel on the left or above or below may also be used.

Although a focal point detection signal generated from a virtual focal point detection pixel based on pixels adjacent to a focal point detection pixel $S_{HA}$ (for example, G pixels) is described with reference to FIGS. 10A through 10C, the embodiments are not limited thereto, and other generation algorithms may also be used. Also, according to an embodiment, a focal point detection pixel is arranged at a R or B pixel, which has a relatively small influence on an image compared to a G pixel, in a RGB Bayer arrangement, and thus, at least one of adjacent G pixels is used to generate a focal point detection signal. However, the embodiments are not limited thereto.

The AF detection unit 118 illustrated in FIG. 1 calculates a phase difference between a focal point detection signal output from a focal point detection pixel $S_{HA}$ and a focal point detection signal generated by using the control unit 106 and detects an AF value. The focal point detection signal may be a value output from a focal point detection pixel (that is, the focal point detection pixel $S_{HB}$), which is in a pair with the focal point detection pixel $S_{HA}$, and may be a left or right focal point detection pixel that is pupil-segmented. Since the focal point detection pixel $S_{HA}$ is a pupil-segmented left focal point detection pixel, the generated focal point detection signal corresponds to a focal point detection signal from a right focal point detection pixel that is pupil-segmented.

The control unit 106 may select a virtual focal point detection pixel according to a photographing mode, that is, according to whether the electronic apparatus 100 is in a still image photographing mode or a video image photographing mode, and may select an algorithm for generating a focal point detection signal from a virtual focal point detection pixel as illustrated in FIGS. 10A through 10C.

Referring to FIGS. 7 and 8 again, of the pair of focal point detection pixels $S_{HA}$ and $S_{HB}$ for horizontally segmenting a pupil, the focal point detection pixel $S_{HA}$ is actually arranged in the image sensor 108, and the focal point detection pixel $S_{HB}$, which is in a pair with the focal point detection pixel $S_{HA}$, is generated based on an image signal from pixels adjacent to the focal point detection pixel $S_{HA}$ as illustrated in FIGS. 10A through 10C. Likewise, from the focal point detection pixels $S_{VC}$ and $S_{VD}$ for vertically segmenting a pupil, the focal point detection pixel $S_{VC}$ is actually arranged in the image sensor 108, and the focal point detection pixel $S_{VD}$, which is in a pair with the focal point detection pixel $S_{VC}$, is generated based on an image signal from pixels adjacent to the focal point detection pixel $S_{VC}$. Accordingly, two focal point detection pixels for detecting a focal point are arranged in a predetermined area (64 pixels) so as to reduce the number of defect pixels of an image compared to the arrangement of focal point detection pixels illustrated in FIG. 7, thereby reducing deterioration of image quality.

Figure 9:
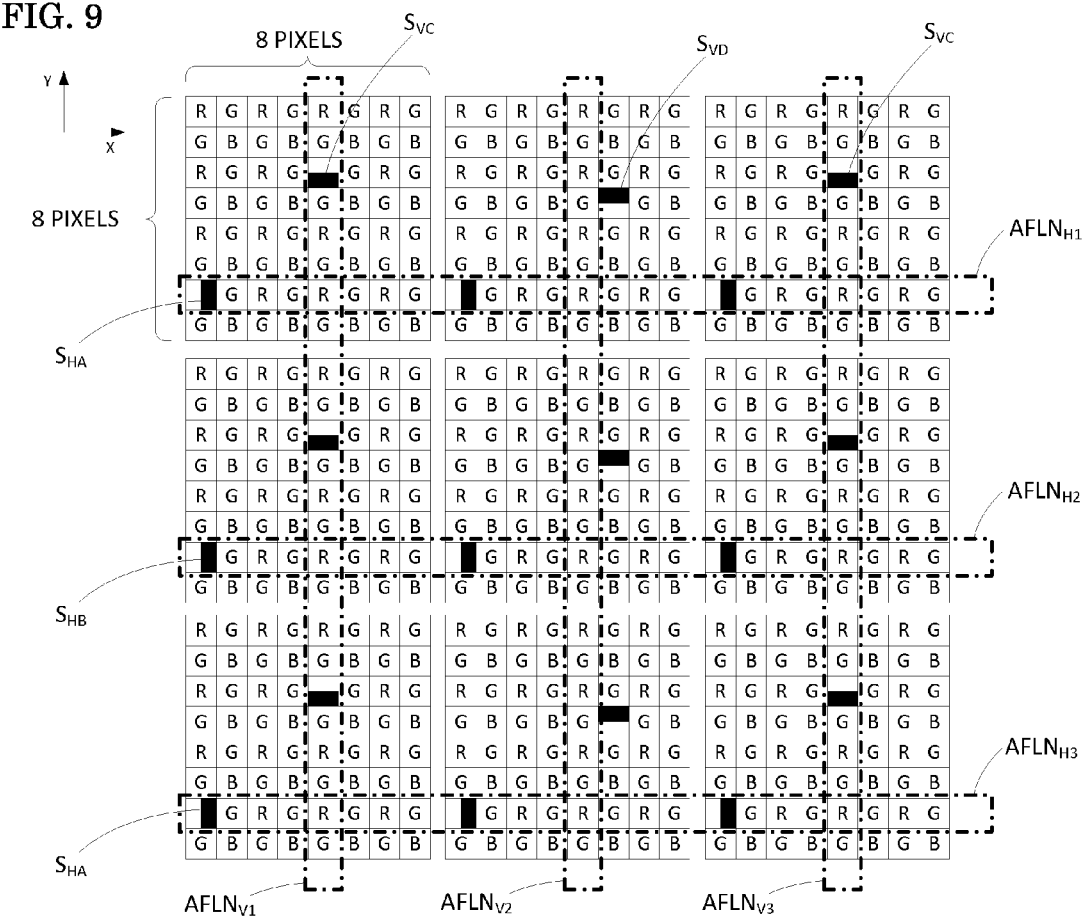
FIG. 9 illustrates an example of arranging focal point detection pixels in an image sensor according to another embodiment.

FIG. 9 illustrates an example of arranging focal point detection pixels in an image sensor according to another embodiment. Referring to FIG. 9, unlike in FIG. 8, a focal point detection pixel $S_{HA}$ is arranged in a first horizontal block of focal point detection pixels arranged in each block of the image sensor 108, and a focal point detection pixel $S_{HB}$ is arranged in a second horizontal block. Also, a focal point detection pixel $S_{VC}$ is arranged in a first vertical block of the focal point detection pixels arranged in each block, and a focal point detection pixel $S_{VC}$ is arranged in a second vertical block. A method of generating a virtual focal point detection signal, which is in a pair with an arranged focal point detection pixel, and generating a focal point detection signal from the virtual focal point detection pixel in the arrangement of focal point detection pixels illustrated in FIG. 9 is the same as described with reference to FIG. 8.

Figure 11A:
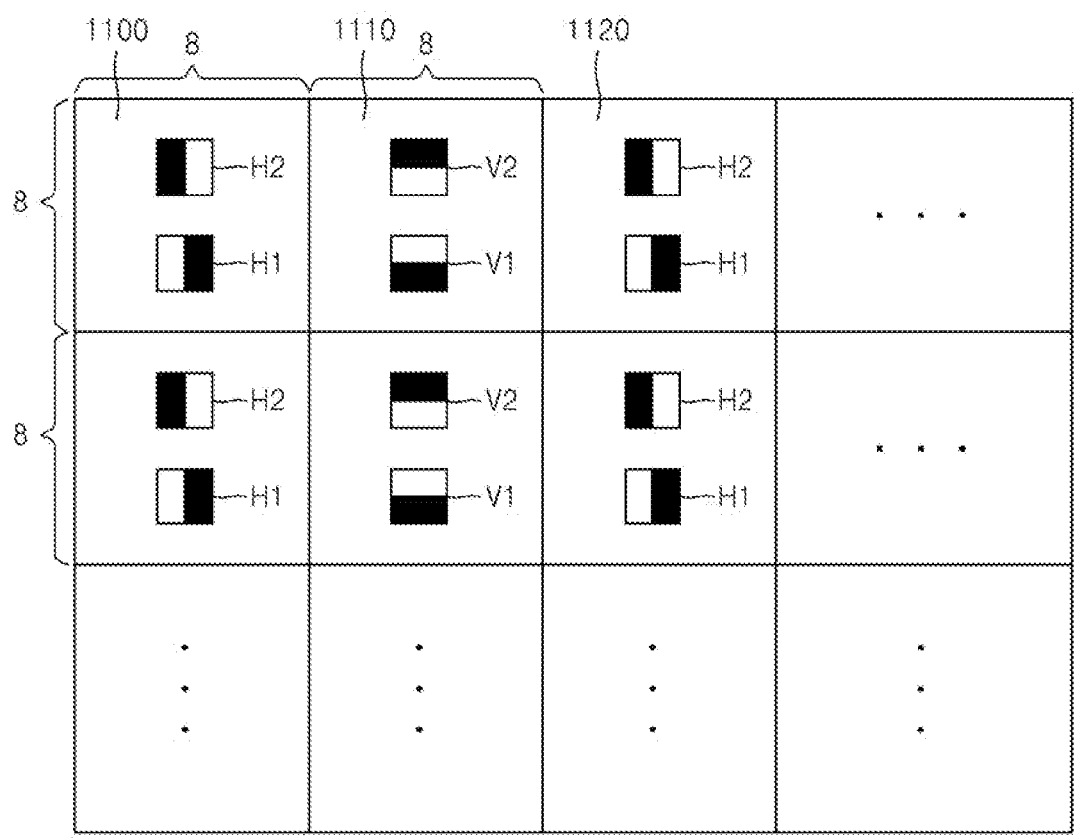
FIGS. 11A and 11B illustrate an example of arranging focal point detection pixels in an image sensor according to another embodiment.
Figure 11B:
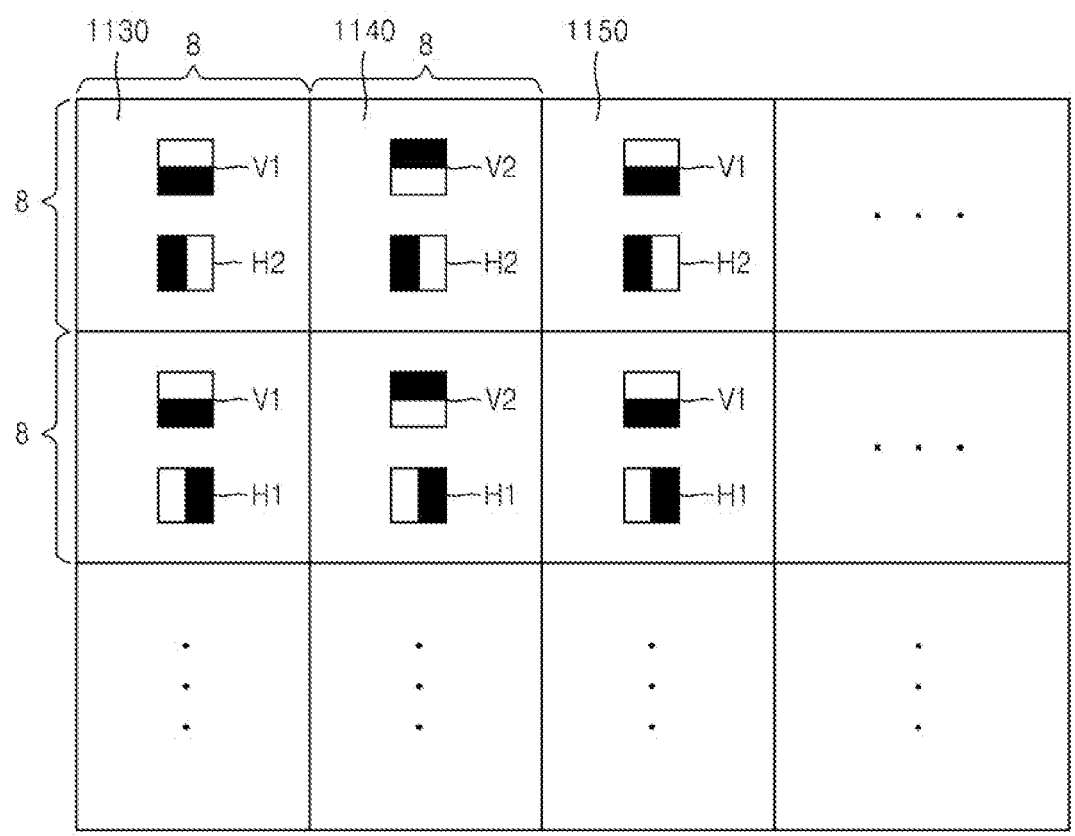

FIGS. 11A and 11B illustrate an example of arranging focal point detection pixels in the image sensor 108, according to another embodiment.

Referring to FIG. 11A, a plurality of image pixels and a plurality of focal point detection pixels H1 and H2 and V1 and V2 are arranged in the image sensor 108. The focal point detection pixels H1 and H2 and V1 and V2 are repeatedly arranged in predetermined areas (areas of 8×8 pixels).

For example, two focal point detection pixels H1 and H2 are arranged horizontally in a first area 1100, two focal point detection pixels V1 and V2 are arranged vertically in a second area 1110, another two focal point detection pixels H1 and H2 are arranged horizontally in a third area 1120, and so on. In this arrangement, when reading out the horizontal focal point detection pixels H1 and H2, after a focal point detection signal is read out in the first area 1100, a focal point detection signal is read out from the horizontal focal point detection pixels H1 and H2 in the third area 1120 after skipping 16 pixels (pitches).

Referring to FIG. 11B, one horizontal focal point detection pixel H2 and one vertical focal point detection pixel V1 are arranged in a first area 1130, one horizontal focal point detection pixel H2 and one vertical focal point detection pixel V2 are arranged in a second area 1140, a horizontal focal point detection pixel H2 and a vertical focal point detection pixel V1 are arranged in a third area 1150, and so on.

Compared to the arrangement of focal point detection pixels illustrated in FIG. 11A, two focal point detection pixels are arranged in a predetermined area (64 pixels) in the same manner, but a read out period (pitch) in a horizontal direction is reduced to eight pixels (16 pixels in FIG. 11). In this arrangement, when the horizontal focal point detection pixel H2 is read out, after a focal point detection signal is read out in the first area 1130, eight pixels (pitches) are skipped and a focal point detection signal is read out from the focal point detection pixel H2 in the second area 1140. Accordingly, a ranging performance may be improved by reducing a read out period (pitch) of a focal point detection pixel, and a HV cross ranging performance may also be improved by arranging focal point detection pixels in vertical and horizontal directions.

In the arrangement of the focal point detection pixels illustrated in FIG. 11B, a focal point detection signal from the horizontal focal point detection pixel H2 of the first area 1130 and the virtual focal point detection pixel corresponding thereto (the horizontal focal point detection pixel H1 illustrated in FIG. 11A) may be generated based on image signals output from at least one of pixels adjacent to the horizontal focal point detection pixel H2 as described above with reference to FIGS. 10A through 10C. Likewise, a focal point detection signal from the vertical focal point detection pixel V1 of the first area 1130 and the virtual focal point detection pixel V2 (see FIG. 11A) corresponding thereto may be generated based on image signals output from at least one of pixels adjacent to the focal point detection pixel V1, as described above with reference to FIGS. 10A through 10C above.

In the embodiment described above with reference to FIGS. 11A and 11B, one horizontal focal point detection pixel and one vertical focal point detection pixel are arranged together in a predetermined area. However, only one of the horizontal or vertical focal point detection pixels may also be arranged in the predetermined area.

FIG. 12 is a flowchart of a method of controlling an electronic apparatus according to another embodiment.

Referring to FIG. 12, in operation 1200, a liveview image is displayed. In operation 1202, when a half-pressed shutter signal or a first shutter release signal S1 is input, in operation 1204, a first focal point detection signal is output from a first focal point detection pixel of an image sensor including a plurality of image pixels and a plurality of focal point detection pixels.

In operation 1206, a second focal point detection signal is generated from a virtual second focal point detection pixel corresponding to the first focal point detection pixel. The second focal point detection signal may be generated based on image pixels adjacent to the first focal point detection pixel, that is, based on image signals of a G pixel that is adjacent horizontally and vertically, a G pixel that is adjacent horizontally, or a G pixel that is adjacent either on the left or on the right, as described above with reference to FIGS. 10A through 10C.

In operation 1208, a phase difference AF value is detected based on a phase difference between the first focal point detection signal and the second focal point detection signal.

In operation 1210, a focal lens is moved to a location according to the detected phase difference AF value.

In operation 1212, if a fully-pressed shutter signal or a second shutter release signal S2 is input, an image signal is read out from the plurality of image pixels in operation 1214. In operation 1216, image data is generated based on the read out image signal.

In operation 1218, the generated image data is stored and recorded.

In the above embodiments, as a second focal point detection pixel, which forms a pair with a first focal point detection pixel arranged in an image sensor is generated based on image signals that are read out from image pixels adjacent to the arranged focal point detection pixel, the number of defect focal point detection pixels in terms of image quality may be minimized.

In addition, by efficiently arranging the focal point detection pixels in the image sensor, high image quality, efficient HV cross ranging, and fast phase difference AF may be obtained, and also, a direction of contrast AF may be determined and a peak confirm time may be reduced through phase detection.

As described above, according to the one or more of the above embodiments, of a pair of focal point detection pixels arranged in an image sensor, a second focal point detection pixel is formed based on image signals that are read out from image pixels adjacent to a first focal point detection pixel so that the number of defect focal point detection pixels in terms of image quality may be minimized.

Also, by efficiently arranging focal point detection pixels in the image sensor, a decrease in image quality may be prevented and efficient HV cross ranging and fast phase difference AF may be achieved.

Also, according to the embodiments, a period of time for determining a direction of contrast AF and confirming a peak may be reduced.

All references, including publications, patent applications, and patents, cited herein are hereby incorporated by reference to the same extent as if each reference were individually and specifically indicated to be incorporated by reference and were set forth in its entirety herein.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

Reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments may be described in terms of functional block components and various processing steps. Such functional blocks may be implemented by any number of hardware and/or software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an", "the", and similar referents in the context of describing the invention (especially in the context of the following claims) is to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

What is claimed is:

1. An electronic apparatus comprising:
    an image sensor including a plurality of image pixels and a plurality of focal point detection pixels;
    an auto-focus (AF) detection unit that detects an AF value based on a first focal point detection signal output from a first focal point detection pixel from the plurality of focal point detection pixels and a second focal point detection signal output from a virtual second focal point detection pixel corresponding to the first focal point detection pixel, wherein the plurality of focal point detection pixels comprise a plurality of horizontal focal point detection pixels and a plurality of vertical focal point detection pixels, wherein the plurality of image pixels and the plurality of focal point detection pixels are repeatedly arranged in the image sensor; and
    a control unit that generates image data based on an image signal output from the plurality of image pixels and the AF value detected by the AF detection unit,
    wherein a horizontal first focal point detection pixel and a vertical first focal point detection pixel are arranged in a first area of the image sensor, and a vertical second focal point detection pixel corresponding to the horizontal first focal point detection pixel and the vertical first focal point detection pixel is included in a second area adjacent to the first area in a horizontal direction.

2. The electronic apparatus of claim 1, wherein the control unit selects the virtual second focal point detection pixel based on at least one image pixel adjacent to the first focal point detection pixel.

3. The electronic apparatus of claim 1, wherein the first focal point detection pixel is the horizontal first focal point detection pixel, and the virtual second focal point detection pixel corresponds to the horizontal first focal point detection pixel.

4. The electronic apparatus of claim 1, wherein the plurality of image pixels and the plurality of focal point detection pixels are repeatedly arranged in the image sensor,
    wherein a vertical first focal point detection pixel and a horizontal first focal point detection pixel are arranged in a first area of the image sensor, and a horizontal second focal point detection pixel corresponding to the vertical first focal point detection pixel and the horizontal first focal point detection pixel is included in a second area adjacent to the first area in a vertical direction.

5. The electronic apparatus of claim 1, wherein the first focal point detection pixel is one of a left or right focal point detection pixel that is pupil-segmented.

6. The electronic apparatus of claim 2, wherein the control unit generates the second focal point detection signal based on an image signal output from the selected virtual second focal point detection pixel.

7. The electronic apparatus of claim 6, wherein the AF detection unit detects a phase difference AF value from a phase difference between the first focal point detection signal output from the first focal point detection pixel and the second focal point detection signal generated from the virtual second focal point detection pixel.

8. The electronic apparatus of claim 6, wherein the control unit generates the second focal point detection signal by dividing a sum of image signals of four G pixels that are vertically and horizontally adjacent to the first focal point detection pixel by 4.

9. The electronic apparatus of claim 6, wherein the control unit generates the second focal point detection signal by dividing a sum of image signals of two G pixels that are horizontally adjacent to the first focal point detection pixel by 2.

10. The electronic apparatus of claim 6, wherein the control unit generates the second focal point detection signal as an image signal of one G pixel horizontally adjacent to the first focal point detection pixel.

11. The electronic apparatus of claim 4, wherein the first focal point detection pixel is the vertical first focal point detection pixel, and the virtual second focal point detection pixel corresponds to the vertical first focal point detection pixel.

12. The electronic apparatus of claim 5, wherein the virtual second focal point detection pixel is one of a right or left focal point detection pixel that is pupil-segmented and corresponds to the one of the left or right focal point detection pixel that is pupil-segmented.

13. An image sensor for phase difference auto-focus (AF), comprising:
    a plurality of image pixels and a plurality of focal point detection pixels that are repeatedly arranged; and
    a horizontal first focal point detection pixel and a vertical first focal point detection pixel arranged in a first area,
    wherein a horizontal AF value is detected based on a phase difference between a horizontal first focal point detection signal output from the horizontal first focal point detection pixel and a horizontal second focal point detection signal from a virtual second focal point detection pixel corresponding to the horizontal first focal point detection pixel, and
    a vertical horizontal AF value is detected based on a phase difference between a vertical first focal point detection signal output from the vertical first focal point detection pixel and a vertical second focal point detection signal from a virtual second focal point detection pixel corresponding to the vertical first focal point detection pixel,
    wherein the horizontal first focal point detection pixel and the vertical second focal point detection pixel are arranged in a second area that is horizontally adjacent to the first area.

14. The image sensor of claim 13, wherein the first focal point detection pixel is one of a left or right focal point detection pixel that is pupil-segmented.

15. The image sensor of claim 13, wherein the vertical first focal point detection pixel and the horizontal second focal point detection pixel are arranged in a second area that is vertically adjacent to the first area.

16. The image sensor claim 14, wherein the virtual second focal point detection pixel is one of a right or left focal point detection pixel corresponding to the left or right focal point detection pixel that is pupil-segmented.

17. A method of controlling an electronic apparatus, the method comprising:
    outputting a first focal point detection signal from a first focal point detection pixel from a plurality of focal point detection pixels of an image sensor including a plurality of image pixels and a plurality of focal point detection pixels, wherein the plurality of focal point detection pixels comprise a plurality of horizontal focal point detection pixels and a plurality of vertical focal point detection pixels, wherein the plurality of image pixels and the plurality of focal point detection pixels are repeatedly arranged in predetermined areas of the image sensor;

detecting an auto-focus (AF) value based on the output first focal point detection signal and a second focal point detection signal from a virtual second focal point detection pixel corresponding to the first focal point detection pixel; and generating image data based on an image signal output from the plurality of image pixels and the detected AF value, wherein a horizontal first focal point detection pixel and a vertical first focal point detection pixel and a vertical second focal point detection pixel corresponding to the horizontal first focal point detection pixel and the vertical first focal point detection pixel are included in a same predetermined area of the predetermined areas.

18. The method of claim 17, further comprising selecting the virtual second focal point detection pixel based on at least one image pixel adjacent to the first focal point detection pixels.

19. The method of claim 17, wherein a vertical first focal point detection pixel and a horizontal first focal point detection pixel and a horizontal second focal point detection pixel corresponding to the vertical first focal point detection pixel and the horizontal first focal point detection pixel are included in a same predetermined area of the predetermined areas.

20. The method of claim 18, further comprising generating the second focal point detection signal based on an image signal output from the selected at least one image pixel.

21. The method of claim 20, wherein the detecting the AF value comprises detecting a phase difference AF value from a phase difference between the first focal point detection signal output from the first focal point detection pixel and the second focal point detection signal generated from the virtual second focal point detection pixel.

\* \* \* \* \*